(12) United States Patent
Mi et al.

(10) Patent No.: US 7,117,294 B1
(45) Date of Patent: Oct. 3, 2006

(54) METHOD AND SYSTEM FOR ARCHIVING AND COMPACTING DATA IN A DATA STORAGE ARRAY

(75) Inventors: Zheng Mi, Union City, CA (US); Yuan Jiang, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 529 days.

(21) Appl. No.: 10/157,939

(22) Filed: May 28, 2002

(51) Int. Cl.
*G06F 13/00* (2006.01)

(52) U.S. Cl. .................... 711/101; 711/161; 711/170

(58) Field of Classification Search ............... 711/101, 711/161, 170
See application file for complete search history.

(56) References Cited

U.S. PATENT DOCUMENTS 5,706,472 A * 1/1998 Ruff et al. .................. 711/173

* cited by examiner

*Primary Examiner*—Reba I. Elmore

(57) ABSTRACT

Embodiments of the present invention are directed to a method and system for archiving and compacting data in a data storage array. In one embodiment, a plurality of archivable files are identified, archived, and removed from a data storage array. A first configuration of the data storage array is then determined in which the free space on each of a plurality of data storage devices in the data storage array is calculated. A process is performed for moving a plurality of files from a first of the data storage devices to other data storage devices in the data storage array. The moving process is repeated to create a second configuration of the data storage array. In the second configuration, the first data storage device has a greater amount of free space than in the first configuration.

28 Claims, 13 Drawing Sheets

METHOD AND SYSTEM FOR ARCHIVING AND COMPACTING DATA IN A DATA STORAGE ARRAY

FIELD OF THE INVENTION

Embodiments of the present invention relate to managing data in data storage arrays. More specifically, the present invention pertains to a method and system for archiving and compacting data in a data storage array.

BACKGROUND OF THE INVENTION

For many organizations, managing data storage resources is a time consuming process which is frequently prone to error. Data storage systems can quickly fill with redundant or outdated files which are occasionally purged from the system. Frequently, it is difficult to determine the ownership of the files being purged or whether those files are actually still needed. This results in mistakenly removing needed files or allowing outdated or redundant files to remain on the data storage array. Furthermore, it is a time consuming process for a person to examine these files and try to determine which files should be purged and which files should remain on the storage array.

For example, software development is frequently performed by teams of developers working in geographically separated locations. These development teams will use a centralized data storage area for storing the particular software component they are working on. Typically, these components resemble directories having hundreds of subdirectories and files. Other software development teams can access this data to ensure their components work together, to import dependencies, as well as in the final integration of the software components.

During the development cycle, there are frequent updates to the components, as well as patches of previous component versions, and/or multiple component versions to allow for the dependencies of other software components. Thus, in a short amount of time the centralized data storage area can fill with redundant or outdated files which must be purged. Occasionally, older files may be extremely stable components and are still considered the most current version. This complicates manually selecting and purging files because the age of the file is not an accurate indicator of whether the file should be purged. Additionally, this complicates identifying files which may be candidates for archival.

Often a list is distributed of the files which are to be purged. This allows developers to identify files which should remain in the centralized data storage area. However, it is a time consuming task for the developers to search the data component hierarchy to determine which files should be purged. This is increasingly true as directory structures become larger and more complex.

Thus, prior art methods for managing centralized data storage systems are time consuming and prone to error. Specifically, there is no method for automatically identifying files which are candidates for archival or removal from the data storage array.

Additionally, there is no method for consolidating files across multiple storage devices (e.g., multiple disk drives in a data storage array). Currently, compacting data in data storage arrays involves compacting each data storage device in the data storage array as a separate resulting in haphazard distribution of available free space among the separate devices. This results in less than optimal utilization of the free space in the data storage array. For example, collectively the free space in the data storage array may be large enough to accommodate large files and directories. However, prior art methods for compacting data result in multiple smaller areas of free space which, individually, may not be large enough to accommodate the larger files.

SUMMARY OF THE INVENTION

Accordingly, a need exists for a method and system for automatically identifying files which can be archived. While meeting the above stated need, it would be advantageous to provide a system which can consolidate free in data storage arrays comprising multiple data storage devices.

Embodiments of the present invention provide a method and system for archiving and compacting data in a data storage array. Embodiments of the present invention facilitate automatically identifying files which are candidates for archiving. According to one embodiment of the present invention, files are assigned a time period for maintaining the files in a data storage array. When the time period expires, users can be notified of an impending archival process in order to identify files which should be exempted from the list of archival candidate files. Files which are not identified as exemptions are automatically archived and removed from the data storage array.

Additionally, embodiments of the present invention facilitate compacting the remaining files across multiple data storage devices in the data storage array in order to consolidate free space into fewer, larger areas. In one embodiment, the free space on each of the storage devices in the data storage array is determined. A drive list is created in which the storage devices are sorted in descending order based upon their amount of free space. The storage device having the largest amount of free space is set aside to support the compacting process. The files on the largest remaining storage device are then sorted in descending order based upon their size. The largest file is compared to a minimum size threshold and, if it exceeds the minimum size threshold, is moved to a second storage device in the data storage array. This process continues until there are no more files remaining on the storage device larger than the minimum size threshold. The process is then repeated upon the next storage device in the drive list, etc.

Embodiments of the present invention are directed to a method and system for archiving and compacting data in a data storage array. In one embodiment, a plurality of archivable files are identified, archived, and removed from a data storage array. A first configuration of the data storage array is then determined in which the free space on each of a plurality of share storage devices in the data storage array is calculated. A process is performed for moving a plurality of file entities from a first of the shared data storage devices to other shared data storage devices in the data storage array. The moving process is repeated to create a second configuration of the data storage array. In the second configuration, the first shared data storage device has a greater amount of free space than in the first configuration.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to the preferred embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "archiving," "determining," "calculating," "performing," "recognizing," "creating," "identifying," "removing," "comparing," "adding," "selecting," "moving," "sorting," "repeating," "excluding," "designating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
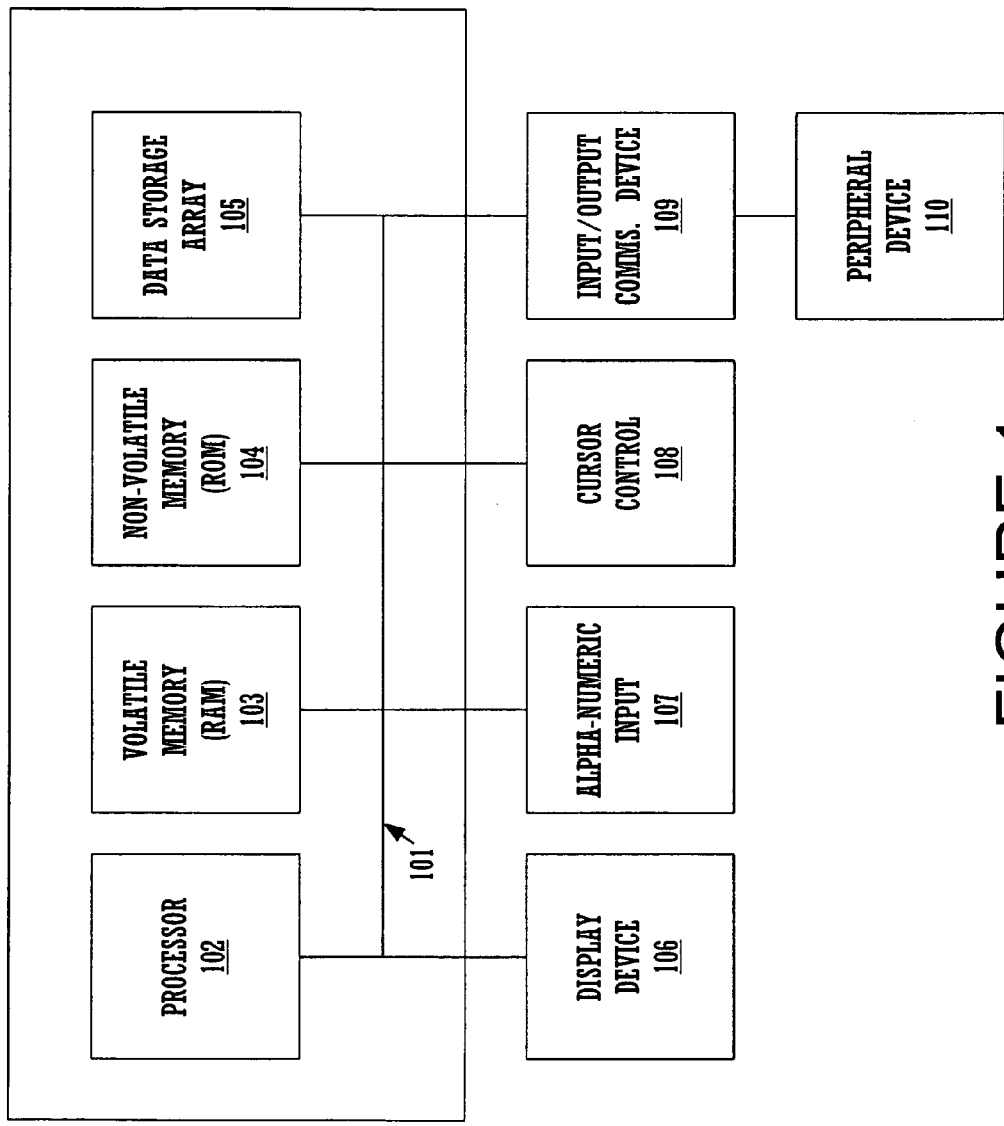
FIG. 1 is a block diagram of an exemplary computer system upon which embodiments of the present invention may be implemented.

With reference to FIG. 1, portions of the present invention are comprised of computer-readable and computer-executable instructions that reside, for example, in computer system 100 which is used as a part of a general purpose computer network (not shown). It is appreciated that computer system 100 of FIG. 1 is exemplary only and that the present invention can operate within a number of different computer systems including general-purpose computer systems, embedded computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 also includes a data storage array 105 for storing vast amounts of data. There are a variety of implementations of data storage array 105 upon which embodiments of the present invention may be utilized including: Storage Area Network (SAN) systems, Network Attached Storage (SAN) systems, Redundant Arrays of Multiple Disks (RAID), etc. It should be noted that the software program for archiving and compacting data of the present invention can be stored either in volatile memory 103, data storage array 105, or in an external storage device (not shown).

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Furthermore, computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, minicomputers, terminals, etc.) are used to run processes for performing desired tasks. In particular, computer system 100 can be coupled in a system for archiving and compacting data in a data storage array.

Figure 2:
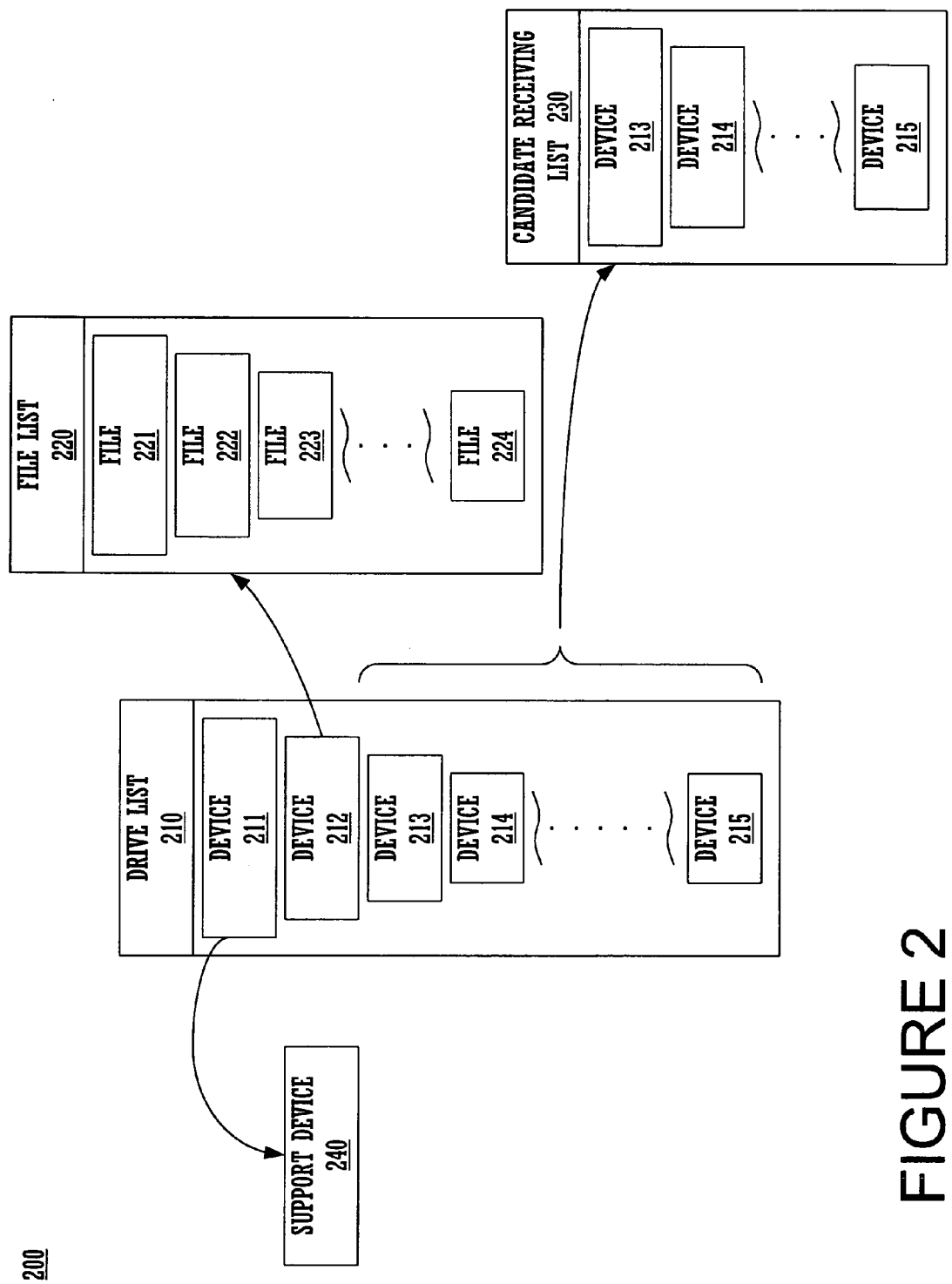
FIG. 2 is a block diagram showing components used in the compacting of data in accordance with embodiments of the present invention.

FIG. 2 is a data flow and block diagram showing components used in the compacting of data in accordance with embodiments of the present invention. FIG. 2 will be referenced in conjunction with the following discussions to clearly describe embodiments of the present invention.

Figure 3:
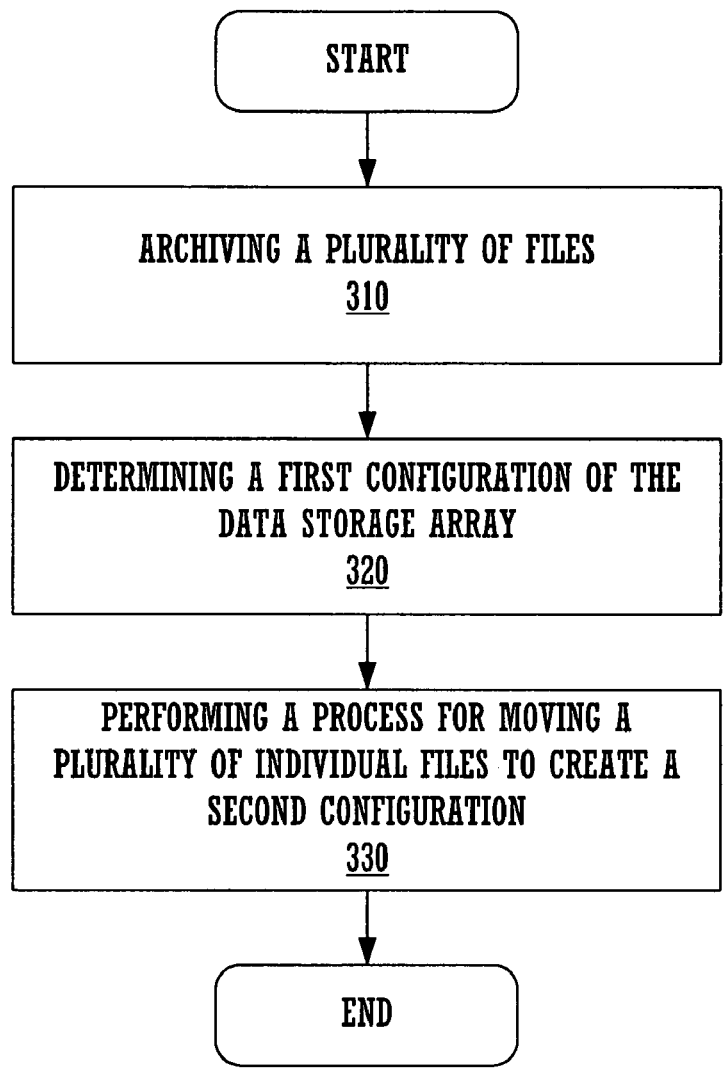
FIG. 3 is a flowchart of a computer implemented method and system for archiving and compacting data in a centralized data storage array in accordance with embodiments of the present invention.

FIG. 3 is a flowchart of a computer implemented method 300 for archiving and compacting data in a centralized data storage array in accordance with embodiments of the present invention. In step 310 of FIG. 3, a plurality of files are archived. In embodiments of the present invention, all entities on data storage array 105, whether referring to a single file or group of related files (e.g., a directory), are generally managed in a similar manner. In one embodiment of the present invention, when a file is initially stored in data storage array 105, a time period for maintaining the file in the data storage array is assigned to the file. In one embodiment of the present invention, the archival process is initiated automatically at a predefined time interval.

Files which are candidates for archival are automatically identified when the time period for maintaining the files in the data storage array has expired. In one embodiment, a list of archival candidates is distributed to allow users to create ad-hoc exemptions to the archival rules. For example, if access to a file is still needed beyond the defined time period, the time period for maintaining the file on data storage array 105 can be extended. In one embodiment of the present invention, archiving comprises creating a copy of the selected files for storage at a remote location. The archived files, as well as files which are no longer needed, can then be removed from data storage array 105. The method for automatically archiving data is described in greater detail in FIG. 4.

In step 320 of FIG. 3, a first configuration of data storage array 105 is determined. After removing archived files and/or other unneeded files, it is likely that the individual data storage devices in data storage array 105 are fragmented. In embodiments of the present invention, free space in data storage array 105 is consolidated by moving files between the data storage devices of data storage array 105 to create larger areas of free space on some of the data storage devices. This allows users to store larger files on data storage array 105 after the compacting process has been performed. A first step in moving the files is to determine the first configuration of data storage array 105. In one embodiment of the present invention, the amount of free space and the total capacity of each of the data storage devices is determined.

In step 330 of FIG. 3, a process is performed for moving a plurality of files from a first data storage device in data storage array 105 to a second data storage device in data storage array to create a second configuration of the data storage array. Once the configuration of data storage array 105 has been determined, a process is then performed which moves files between the data storage devices. Again, in one embodiment of the present invention, all file entities (e.g., a single file or a group of related files such as a directory) are moved in a similar manner. Files are moved from a first data storage device to a second data storage device to create second configuration of data storage array 105 in which free space consolidated in fewer, larger areas. In one embodiment of the present invention, the data storage devices are sorted into a list (e.g., drive list 210 of FIG. 2) and the process for moving files is performed sequentially upon the list of data storage devices. For example, all of the files (e.g., file list 230 of FIG. 2) on the first data storage device which are within assigned parameters are moved from the first data storage device to a second data storage device within data storage array 105. The process for moving files between data storage devices is discussed in greater detail in FIG. 5.

In one embodiment of the present invention, the process for moving files is performed upon the half of the data storage devices having the greatest amount of free space. For example, if there are 30 data storage devices in the data storage array, the process for moving files is repeated until files have been moved from the 15 data storage devices having the greatest amount of free space. This expedites the moving process because at some point the benefit derived from moving files between the various data storage devices is out-weighed by the amount of time used to perform the process.

In so doing, the present invention provides a method and system for archiving and compacting data in a data storage array. Files are automatically identified which are candidates for consolidation. This reduces the workload associated with manually identifying files which can be archived. Additionally, the possibility of error in identifying files which are candidates for archival is greatly reduced. The present invention also provides a method and system for compacting files in a data storage array which consolidates available free space in the data storage array as a whole rather than a collection of separate data storage devices.

Figure 4:
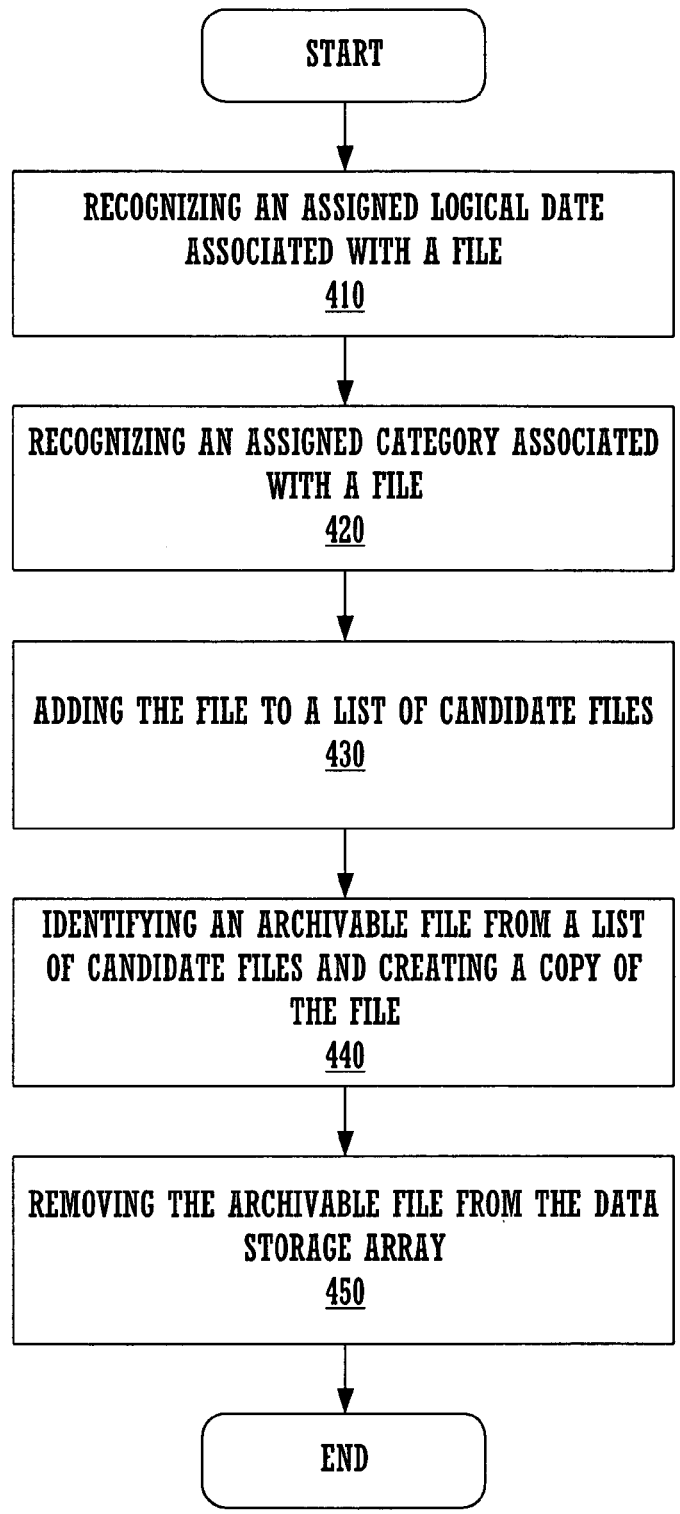
FIG. 4 is a flowchart of a computer implemented method for archiving data in accordance with one embodiment of the present invention.

FIG. 4 is a flowchart of a computer implemented method 310 for archiving data in accordance with one embodiment of the present invention. Process 310 of FIG. 4 corresponds to step 310 of FIG. 3.

In step 410 of FIG. 4, an assigned logical date associated with a file is recognized. In accordance with embodiments of the present invention, the logical date defines the beginning of a time period for maintaining a file in data storage array 105. For example, in a software development environment the logical date can be a milestone in the development cycle defining when a software component should be available in data storage array 105 for access by other development teams. In accordance with embodiments of the present invention, the logical date can be assigned by a user when they initially store the file in data storage array 105. Alternatively, a logical date (e.g., a system timestamp) can be automatically assigned to the file if a user does not assign a logical date to the file.

In step 420 of FIG. 4, an assigned category associated with a file is recognized. In accordance with embodiments of the present invention, the assigned category defines a length of time for maintaining the file in data storage array 105. For example, a "category A" file is kept in data storage array 105 for 3 weeks after the logical date of step 410, while a "category B" file is kept for 2 weeks after the logical date, etc. Thus, the logical date in combination with the assigned category define a specific time period for maintaining a given file in data storage array 105. Additionally, the category can be used for implementing other rules or policies on specific files. This is discussed in greater detail in the discussion of step 430.

In step 430 of FIG. 4, the file is added to a list of candidate files. In one embodiment, a query is performed in which the length of time defined by the assigned category of step 420 is subtracted from the current date to define an archival date. If the logical date of step 410 precedes the archival date, the file is added to the list of candidate files. In other words, if the time window for maintaining the file in data storage array 105 has elapsed, the file is automatically added to a list of candidate files. The list of candidate files identifies files which are eligible for archival but have not yet been selected for archival.

For example, if the current date is January 31, and a file has a predetermined time period of 3 weeks, the archival date is January 10. In one embodiment, any file with a logical date which precedes the archival date is automatically added to the candidate list. Therefore, if a file has a logical date of January 9 or before, it is automatically added to the list of candidate files.

Additionally, in one embodiment of the present invention, files lacking either an assigned logical date or an assigned category are automatically added to the list of candidate files. This facilitates archival of files which were, for example, stored in data storage array 105 prior to the implementation of the present invention.

In accordance with embodiments of the present invention, files can be identified as exceptions to the archival process according to the category which has been assigned to them. Files preserved by policies or business rules are queried out of data storage array 105 and filtered out of the candidate list. For example, a policy can be defined as:

if a file has a logical date D earlier than the archival date, and a real timestamp later than the archival date, then all the files in the same category with logical timestamps later than D will also remain in data storage array 105.

In step 440 of FIG. 4, an archivable file is identified from the list of candidate files and a copy of the archivable file is created. In one embodiment, a list of the candidate files is distributed to allow users to see what files are on the archivable file list. Additionally, users can then identify ad-hoc exceptions to the archival process. For example, if a particular file is needed for a longer period than was originally anticipated, a user can identify that file as an ad-hoc exception to the archival process to extend the time period for maintaining that particular file in data storage array 105. Files which are identified by users as ad-hoc exceptions are removed from the candidate entities list. A copy of each of the files on the archivable file list is made for storage at a remote location.

In step 450 of FIG. 4, the archivable file is removed from data storage array 105. After a copy has been made of the archivable files, the archivable entities are removed from data storage array 105. Additionally, files which are no longer needed (e.g., files not archived and not identified as exceptions to the archival process) are removed from data storage array 105. In one embodiment of the present invention, information is maintained to facilitate future recovery of the file if necessary. For example, a repository file number, symbolic link, real path, archive date etc., is maintained to facilitate retrieving the archived file becomes necessary.

Thus, embodiments of the present invention provide a method for automatically identifying files which are candidates for archival. This reduces the possibility of human error in identifying archivable files while reducing the workload for users. Additionally, the method of the present can be adapted to the unique requirements and policies of the user.

Figure 5:
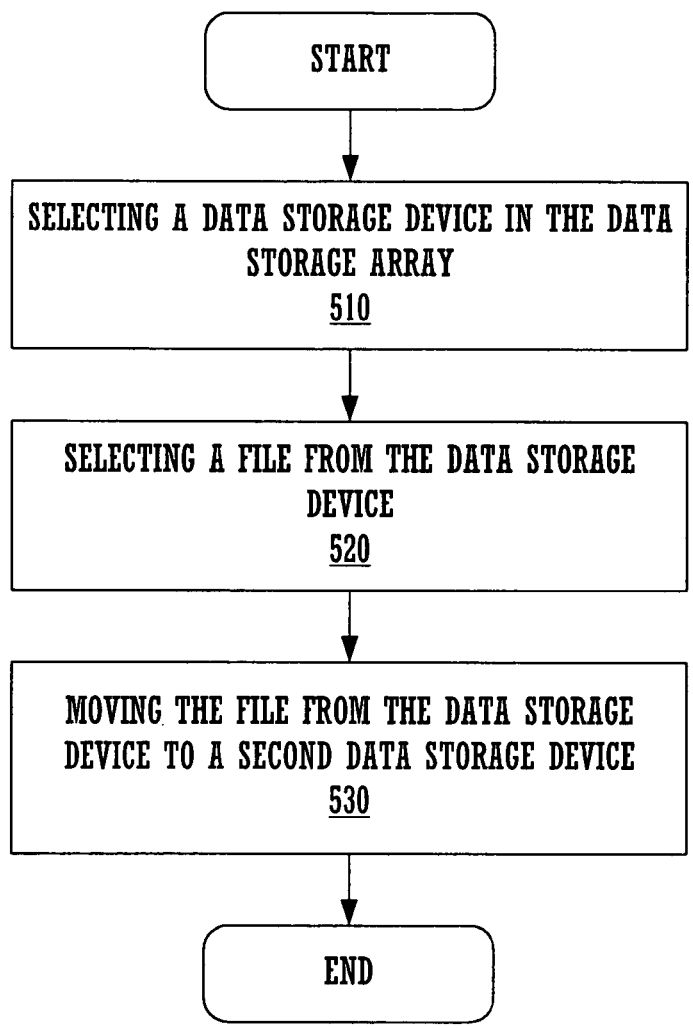
FIG. 5 is a flowchart of a computer implemented process for moving a plurality of files between a plurality of data storage devices in a data storage array in accordance with embodiments of the present invention.

FIG. 5 is a flowchart of a computer implemented process 330 for moving a plurality of files between a plurality of data storage devices in a data storage array in accordance with embodiments of the present invention. Process 330 of FIG. 5 corresponds to step 330 of FIG. 3. In step 510 of FIG. 5, a data storage device in data storage array 105 is selected.

Figure 6:
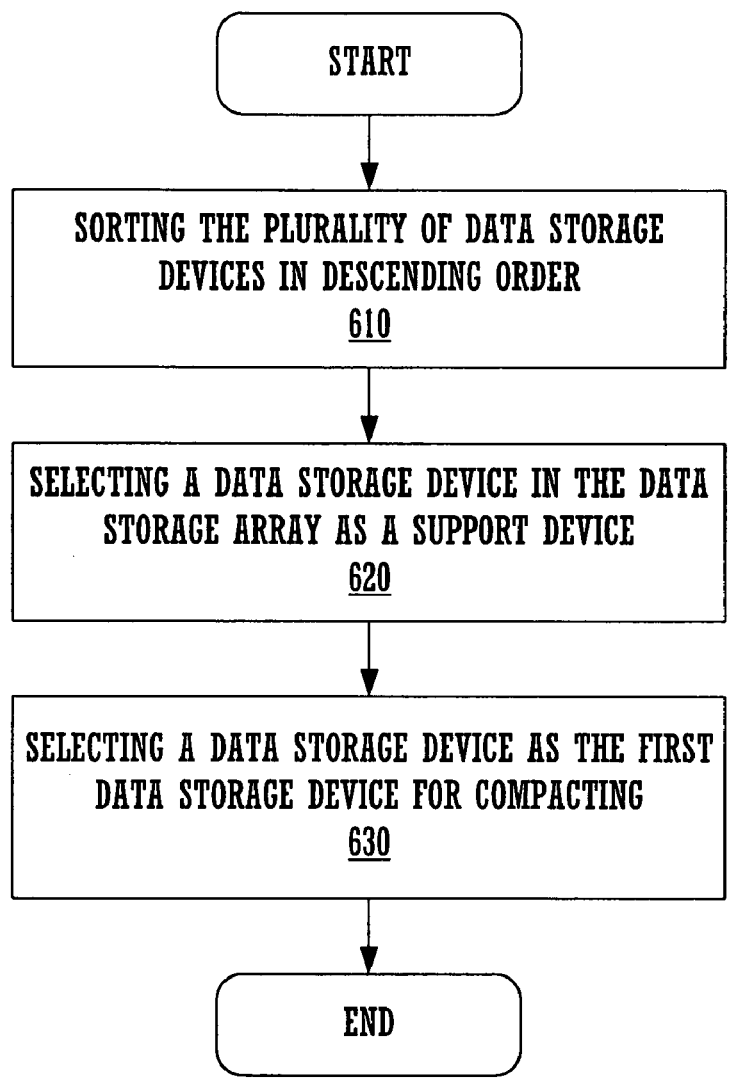
FIG. 6 is a flowchart of a computer implemented method for selecting a data storage device for compacting in accordance with embodiments of the present invention.

FIG. 6 is a flowchart showing in greater detail one embodiment of process 510 for selecting a data storage device.

Referring now to step 610 of FIG. 6, the plurality of data storage devices is sorted in descending order. In one embodiment of the present invention, the descending order is based upon the amount of free space remaining on each of the data storage devices as determined in step 320 of FIG. 3. Thus, a list of the data storage devices (e.g., drive list 210 of FIG. 2) is created wherein the device with the greatest amount of free space (e.g., device 211 of FIG. 2) is at the top of the list and the device with the least amount of free space (e.g., device 215 of FIG. 2) is at the bottom of the list.

In step 620, of FIG. 6, a data storage device in data storage array 105 is selected as a support device (e.g., support device 240 of FIG. 2). In one embodiment of the present invention, the data storage with the greatest amount of free space device (e.g., device 211 of FIG. 2) is set aside for use as a support device 240. In accordance with embodiments of the present invention, support device 240 can be used as temporary storage space when moving files between the various data storage devices in data storage array 105. Support device 240 is removed from drive list 210 to prevent including it in subsequent steps for compacting data.

In step 630 of FIG. 6, a data storage device in the shared storage array is selected as the first data storage device to be compacted. In one embodiment of the present invention, the remaining data storage device having the greatest amount of free space (e.g., device 212 of FIG. 2) is selected as the first data storage device to be compacted. Therefore, the first data storage device has less free space than support device 240, but has a greater amount of free space than any other data storage device in data storage array 105. Thus, a data storage device is selected for compacting from data storage array 105 in accordance with embodiments of the present invention.

Figure 7:
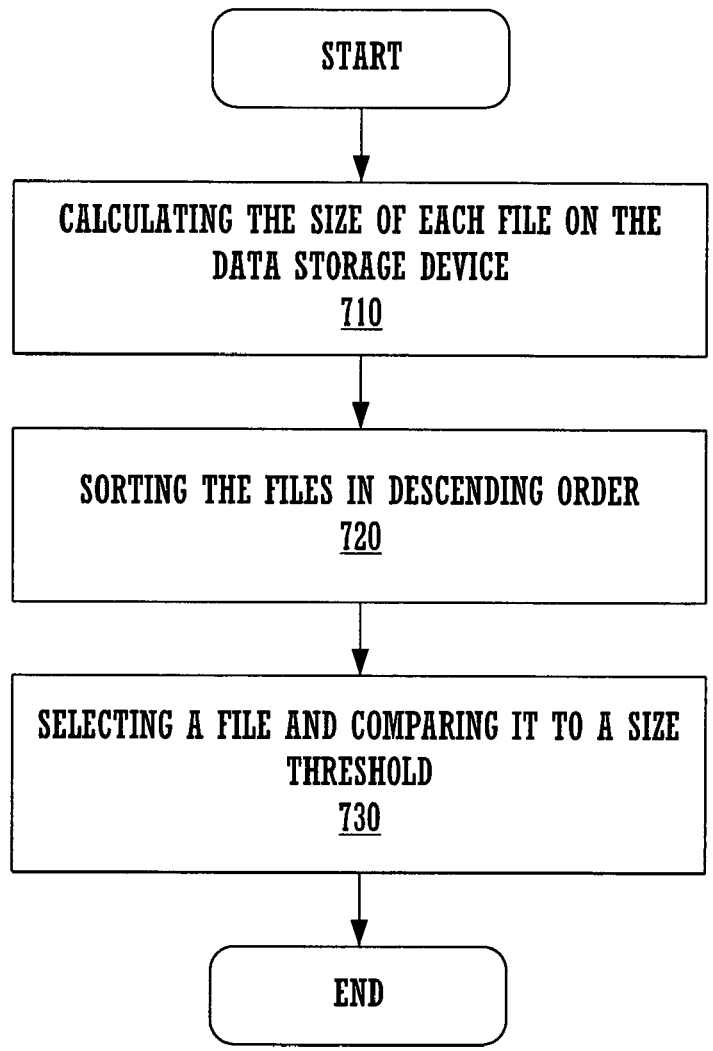
FIG. 7 is a flowchart of a computer implemented method for selecting a file for moving in accordance with embodiments of the present invention.

Referring now to step 520 of FIG. 5, a file from the first data storage device is selected. FIG. 7 is a flowchart showing in greater detail process 520 for selecting a file in accordance with embodiments of the present invention. In step 710 of FIG. 7, the size of each file on data storage device 212 is calculated.

In step 720 of FIG. 7, the files are sorted. In one embodiment of the present invention, a file list 220 is created which lists the files on device 212 sorted in descending order based upon the size of the file. For example, the largest file on file list 220 (e.g., file 221 of FIG. 2) is at the top of the list 220 followed by successively smaller files with the smallest file (e.g., file 224 of FIG. 2) at the bottom of the list 220.

In step 730 of FIG. 7, a file is selected and compared to a size threshold. In one embodiment of the present invention, the largest file (e.g., file 221 of FIG. 2) is selected as the first file for moving. In accordance with embodiments of the present invention, the each file being moved is compared with a size threshold. In one embodiment, the size threshold defines the minimum size of a file being moved. While the present embodiment recites the size threshold defining the minimum size of a file being moved, the present invention is well suited utilizing the size threshold to define a variety of parameters.

Figure 8:
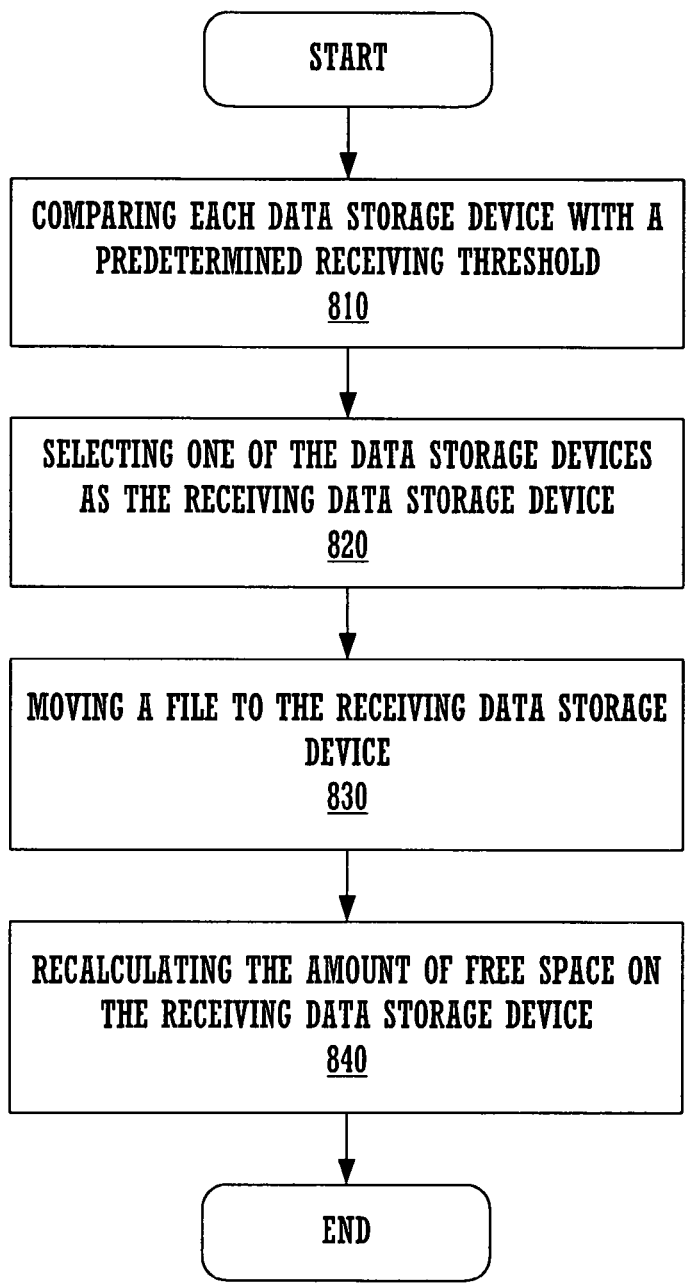
FIG. 8 is a flowchart of a computer implemented method for selecting a receiving data storage device in accordance with embodiments of the present invention.

Referring now to step 530 of FIG. 5, the selected file (e.g., file 221 of FIG. 2) is then moved from the first data storage device (e.g., device 212 of FIG. 2) to a second data storage device in data storage array 105 (e.g., device 214 of FIG. 2). FIG. 8 is a flowchart of a process 530 for moving a file from a first data storage device to a second data storage device in accordance with one embodiment of the present invention. Process 530 of FIG. 8 corresponds to step 530 of FIG. 5.

In step 810 of FIG. 8, each data storage is compared with a predetermined receiving threshold. For example, each of the data storage devices which is not the support device or the first data storage device being compacted can be added to a list of candidate receiving devices (e.g., candidate receiving list 230 of FIG. 2). In one embodiment of the present invention, the predetermined receiving threshold is a percentage of the amount of free space compared to the total capacity of the data storage device and is unique to each of the candidate receiving devices. This receiving threshold can be used to identify storage devices which may not have sufficient capacity for receiving additional files. For example, the receiving threshold can be set so that a data storage device with free space less than 20% of its total capacity is not eligible for receiving additional files. In one embodiment of the present invention, devices not having enough free space are removed from the list of candidate receiving devices 230.

In step 820 of FIG. 8, one of the data storage devices (e.g., device 214 of FIG. 2) is selected to receive the file from the first data storage device. There are a variety of rules for selecting the receiving data storage device. For example, in one embodiment, the first data storage device on the list of candidate receiving devices having enough free space to accommodate the file is as the receiving data storage device. In another embodiment, the data storage device having an amount of free space which most closely matches the size of the file being moved is selected as the receiving device.

In step 830 of FIG. 8, the file is moved from the first data storage device to the receiving data storage device. The selected file is moved from the data storage device upon which it resides to a second data storage device in data storage array 105. For example, file 221 is moved from data storage device 212 to data storage device 224 if device 224 exceeds its receiving threshold and has sufficient space for receiving file 221.

In step 840 of FIG. 8, the amount of free space on the receiving data storage device is recalculated. After receiving the file from the first data storage device, the amount of free space on the receiving data storage device 214 is recalculated and compared with its total capacity to determine whether device 224 is eligible for receiving additional files. If receiving data storage device 214 is still within the receiving threshold, it will remain on the list of candidate receiving devices 230, otherwise, it will be removed from the list of candidate receiving devices 230. In accordance with embodiments of the present invention, step 530 is repeated until there are no longer any files remaining on the data storage device that are larger than the minimum size threshold. When this occurs, the data storage device being compacted is removed from the list of data storage devices and the compacting process is repeated. For example, the amount of free space on the remaining data storage devices is determined, the devices are sorted according to the amount of free space on each device, and the process for moving files is initiated upon the device (e.g., device 213 of FIG. 2) having the greatest amount of free space.

An example of the high-level logic describing process 530 can be exemplified in the following pseudo-code where "driveList" describes a list of data storage devices in data storage array 105 and fileList describes a list of the files on a given data storage device:

```
for a file in fileList {
    if (size (file)>FILE_SIZE_THRESHOLD) {
        s<- find slot on a D^r from (D^3 ... D^x) using first fit rule:
        (or best-fit rule, or other rule defined for the specific situation)
        if (slot s found) {
            move file to s:
            decrease free space on D^r by size(file);
            if (free space (D^r)/space(D^r)<threshold) {
                driveList <_driveList-D^r:
            }
        }
    }
}
```

In accordance with embodiments of the present invention, the number of times this process is performed can be set as a parameter. For example, if the parameter is set to only perform one "loop" of process 330, files will only be moved from the first data storage device in data storage array 105 (e.g., device 211 of FIG. 2). If the parameter is set to perform two loops, only two data storage devices (e.g., devices 211 and 212 of FIG. 2) will be compacted.

In one embodiment of the present invention, another parameter allows a user to determine which devices in data storage array 105 will be compacted. For example, in a data storage array having 36 data storage devices, the data compacting process could be limited to devices D4–D14.

In so doing, a process for archiving and compacting data in a data storage array is performed in accordance with embodiments of the present invention. The process for compacting data in the present invention consolidates free space in the data storage array as a whole rather than consolidating free space in each data storage device separately. This results in fewer, larger areas of free space in the data storage array which can accommodate larger files.

Figure 9A:
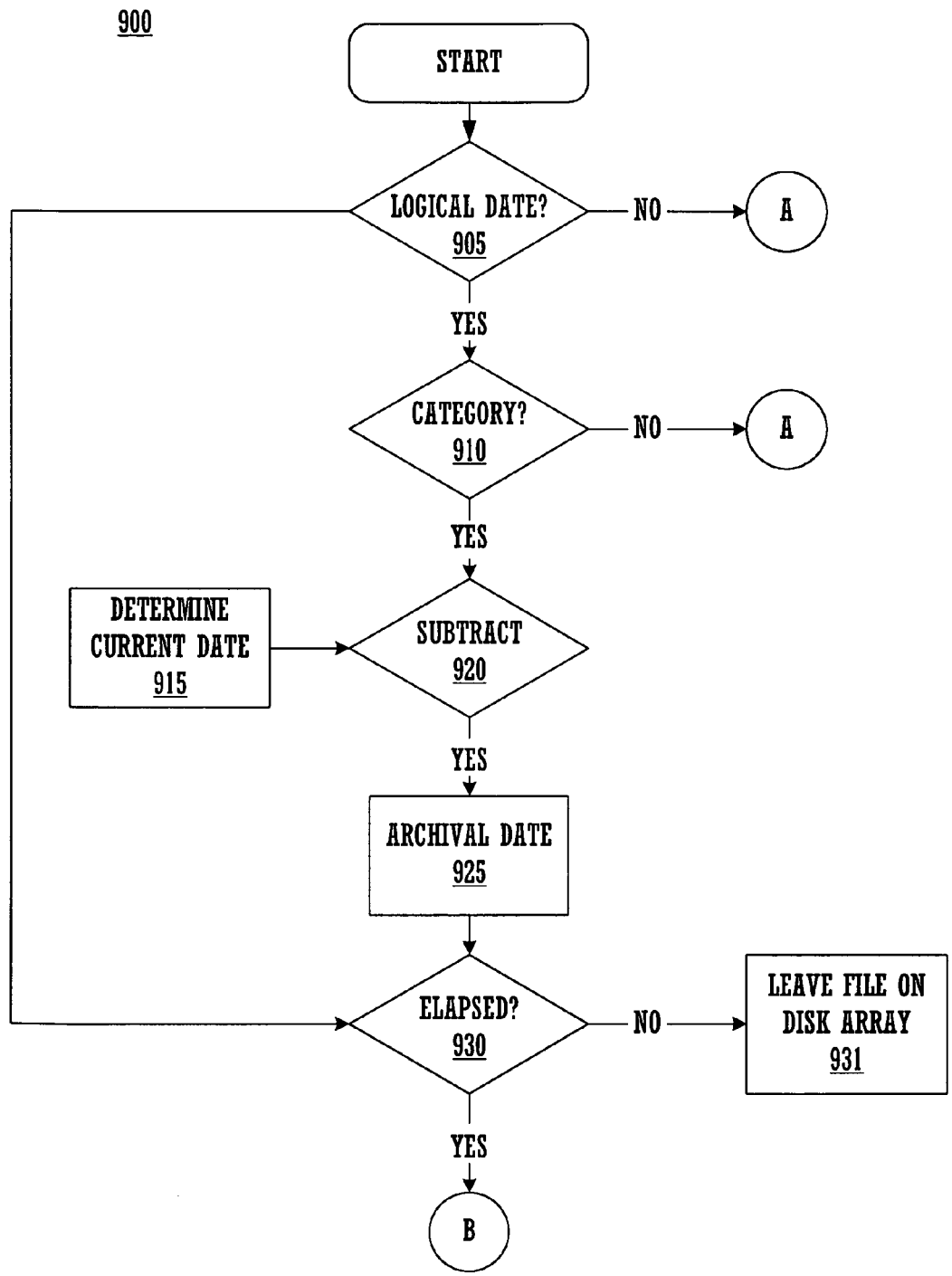
FIGS. 9A and 9B are flowcharts of a computer implemented method for archiving data stored in a centralized data storage array in accordance with embodiments of the present invention.
Figure 9B:
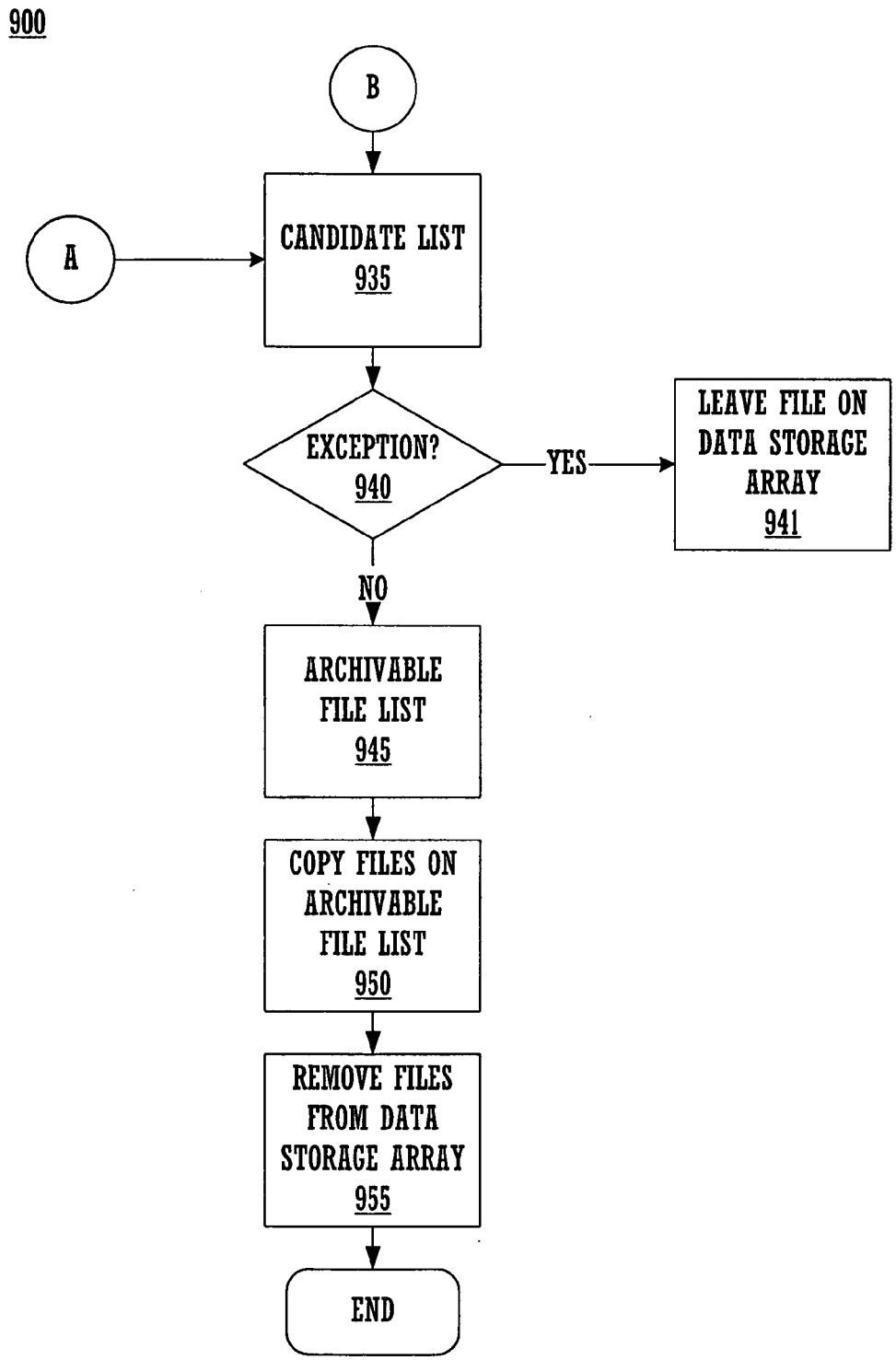

FIGS. 9A and 9B are a flowchart of a computer implemented method 900 for archiving data stored in a centralized data storage array (e.g., data storage array 105 of FIG. 1) in accordance with embodiments of the present invention. Method 900 is used to automatically identify files which are candidates for archiving and for archiving and removing the files from a data storage array.

In step 905 of FIG. 9A, a logic operation is performed to determine whether a logical date has been assigned to a selected file (e.g., file 221 of FIG. 2). If a logical date is recognized, the selected file proceeds to step 910 of FIG. 9A, otherwise, the selected file is automatically added to a list of candidate files (e.g., candidate list 935 of FIG. 9B). The logical date defines a beginning of a time period for maintaining the selected file in data storage array 105.

In step 910 of FIG. 9A, a logic operation is performed to determine whether a category has been assigned to a selected file. If a category has been assigned to the selected file, the selected file proceeds to step 920 of FIG. 9A, otherwise, the selected file is automatically added to a list of candidate files (e.g., candidate list 935 of FIG. 9B). The category is used to define the length of the time period for maintaining the selected file in data storage array 105.

In step 915 of FIG. 9A, the current date is determined.

In step 920 of FIG. 9A, the time period defined by the category of step 910 is subtracted from the current date. For example, if the time period for maintaining the selected file in data storage array 105 is 3 weeks, and the current date is January 31, an archival date (e.g., archival date 925 of FIG. 9A) of January 10 is defined.

In step 930 of FIG. 9A, a logic operation 930 is to determine whether the time period for maintaining the selected file in data storage array has elapsed. For example, in one embodiment of the present invention, if the logical date precedes the archival date, the time period for maintaining the selected file has elapsed and the selected file will automatically be added to candidate list 935 of FIG. 9B. In the example cited above, it the logical date is January 4, and the archival date is January 10, the selected file will automatically be added to candidate list 935. If the time period for maintaining the selected file on data storage array has not elapsed, the file will remain on data storage array 105 (e.g., step 931 of FIG. 9A).

Referring now to step 940 of FIG. 9B, a logic operation is performed to determine whether any of the files on candidate list 935 are exceptions to the archival process. In one embodiment, category 910 of FIG. 9A can also include policies or rules which will identify a selected file as an exception to the archival process. Files preserved by policies or business rules are queried out of data storage array 105 and filtered out of the candidate list. For example, a policy can be defined as:

if a file has a logical date D earlier than the archival date, and a real timestamp later than the archival date, then all the files in the same category with logical timestamps later than D will also remain in data storage array 105.

In accordance with embodiments of the present invention, a list can be distributed to allow users to identify files which are ad-hoc exceptions to the archival process. Ad-hoc exceptions to the archival process are files which are not exempted from archival based upon their category, but which should be maintained in data storage array 105. For example, if access to a file is still necessary after the time period for maintaining the file on data storage array 105 has expired, a user can identify that file as an ad-hoc exception to the archival process. The file will then be removed from candidate list 935 and the selected file will remain on data storage array 105 (e.g., step 941 of FIG. 9B).

In step 945 of FIG. 9B, an archivable file list is created. In one embodiment of the present invention, archivable file list 945 comprises the files from candidate list 935 which were not identified as exceptions to the archival process. In one embodiment of the present invention, users can identify files which are no longer needed on data storage array 105 and which can be deleted. A copy of each of the files on archivable file list 945 is made for storage at a remote location. In one embodiment of the present invention, information is kept to facilitate future recovery of the file if necessary. For example, a repository file number, symbolic link, real path, archive date etc., is kept to facilitate retrieving the archived file becomes necessary.

In step 950 of FIG. 9B, files on the archivable file list are copied for storage at a remote location. In step 955 of FIG. 9B, the archived files are removed from data storage array 105. Once a copy of one of the archivable files is created, the file is removed from data storage array 105.

Figure 10A:
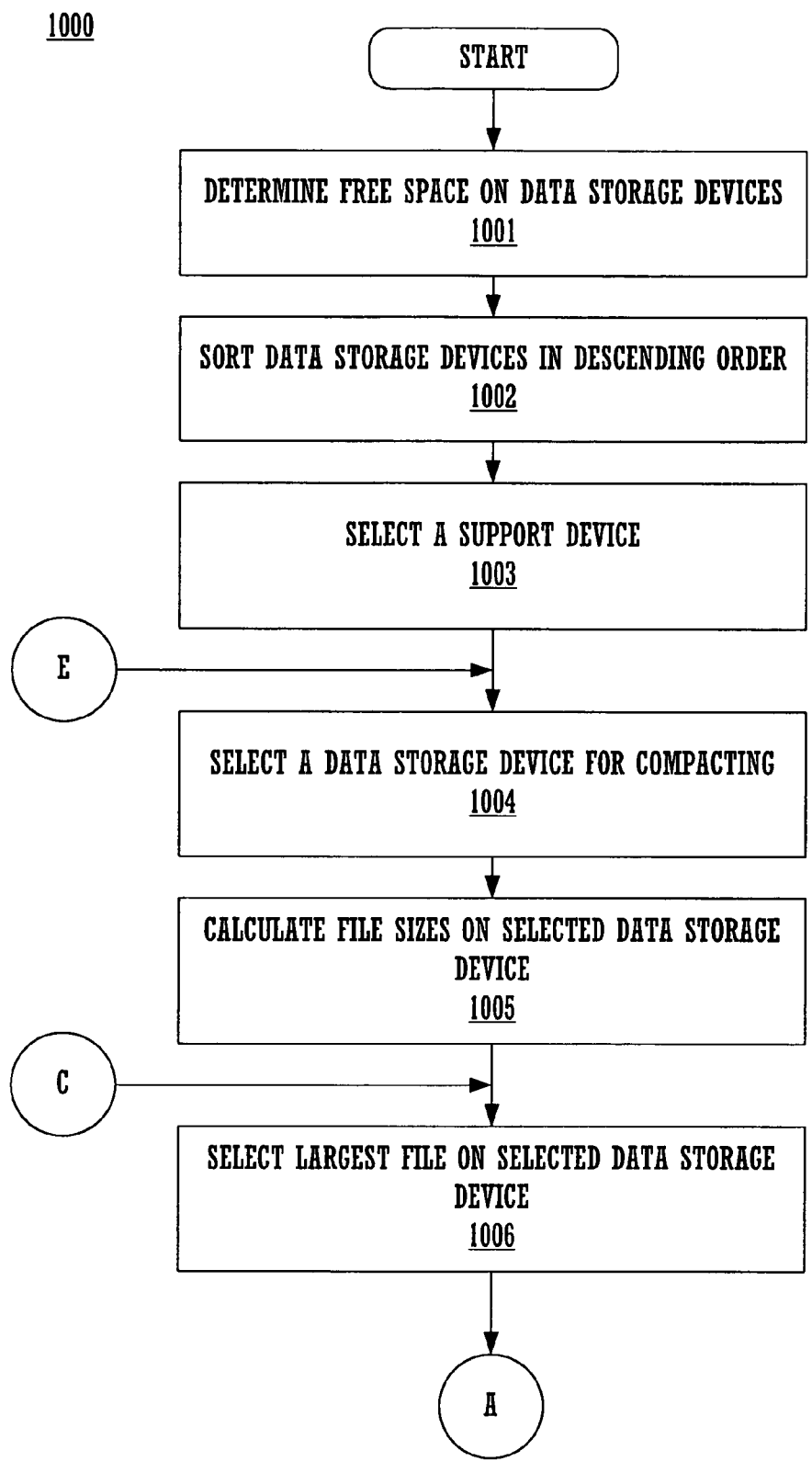
FIGS. 10A, 10B, and 10C, are flowcharts of a computer implemented method for compacting data stored in a data storage array in accordance with embodiments of the present invention.
Figure 10B:
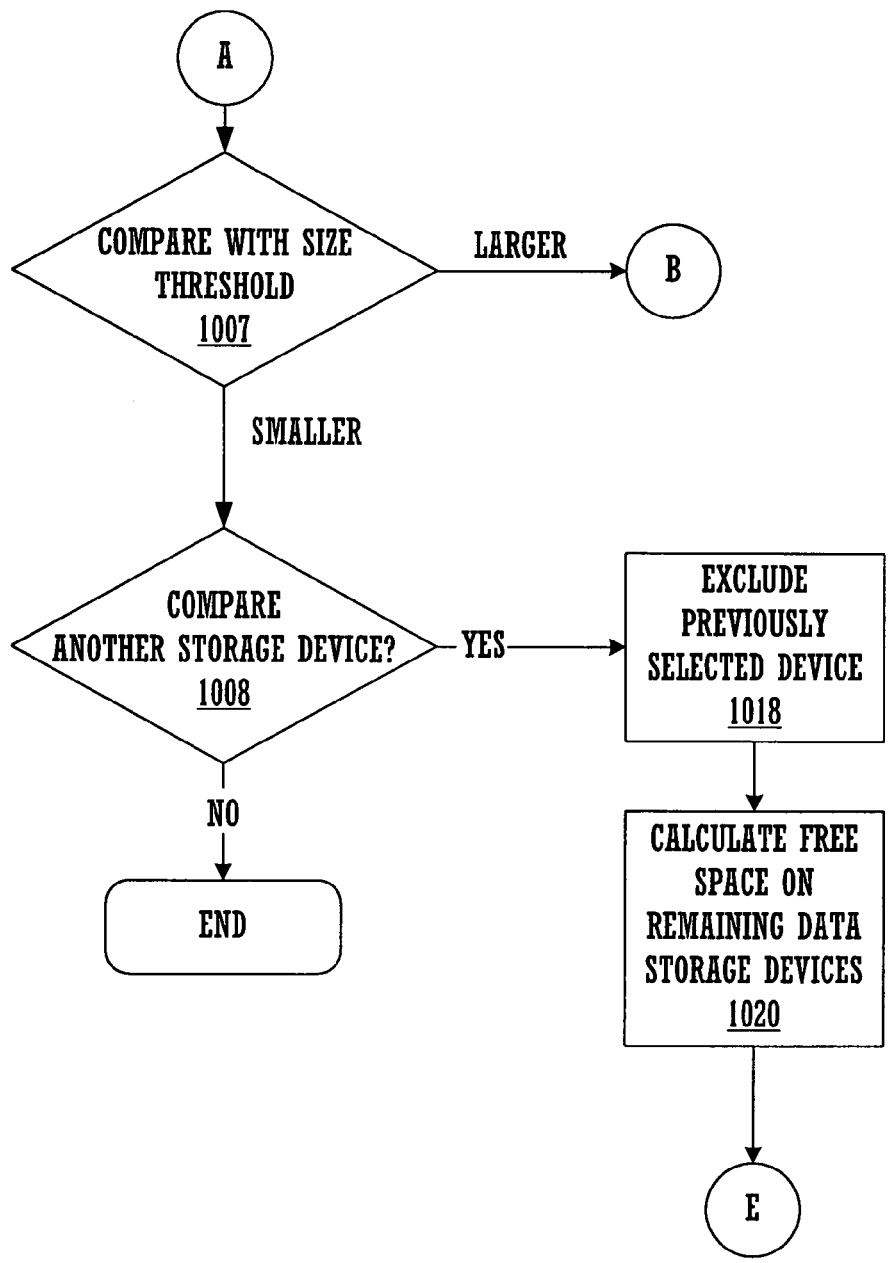
Figure 10C:
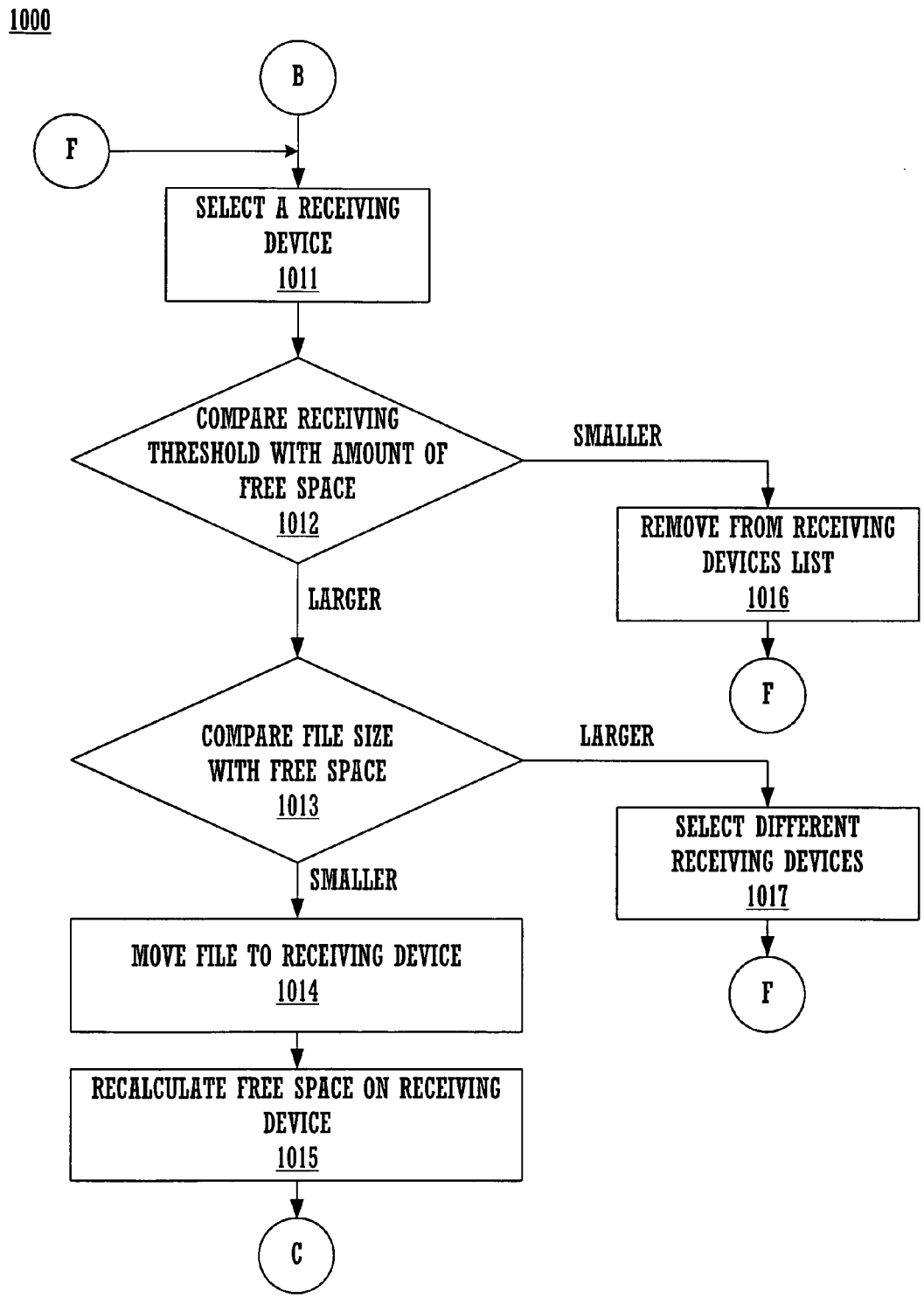

FIGS. 10A, 10B, and 10C are a flowchart of a computer implemented method 1000 for compacting data stored in a data storage array in accordance with embodiments of the present invention.

In step 1001 of FIG. 10A, the free space on each of the data storage devices comprising data storage array 105 is determined. In embodiments of the present invention, the total capacity of each of the data storage devices is determined as well.

In step 1002 of FIG. 10A, the data storage devices are sorted in descending order. In embodiments of the present invention, the data storage devices are sorted in descending order based upon the amount of free space as determined in step 1001. Referring to FIG. 2, drive list 210 lists the data storage devices comprising data storage array 105. The data storage devices are listed in descending order (e.g., device 211–device 215) based upon the amount of free space remaining on each drive.

In step 1003 of FIG. 10A, a support device is selected. In one embodiment, the data storage device with the largest amount of free space is selected as the support device. The support device can be used to facilitate moving files between the data storage devices during the compacting process. Referring to FIG. 2, device 211 is selected as support device 240 because it has a greatest amount of free space than any other data storage device in data storage array 105.

In step 1004 of FIG. 10A, a data storage device is selected for compacting. In one embodiment of the present invention, the data storage device with the largest amount of free space of the remaining data storage devices on drive list 210 (e.g., device 212 of FIG. 2) is selected as the first data storage device to be compacted.

In step 1005 of FIG. 10A, the file sizes on the selected data storage device are calculated. In embodiments of the present invention, the files residing on the selected data storage device are sorted in descending order based upon their size. Referring to FIG. 2, file list 220 lists files 212–224 in descending order based upon the size of each file.

In step 1006 of FIG. 10A, the largest file on the selected data storage device (e.g., file 221 of FIG. 2) is selected. In accordance with embodiments of the present invention, the largest file on a data storage device selected for compacting is the first file to be moved.

Referring now to FIG. 10B, in step 1007 a logic operation is performed in which the file from step 1006 is compared with a predetermined size threshold. In embodiments of the present invention, the size threshold defines the minimum size a file must be in order to be moved to a different data storage device. In one embodiment, the size threshold is set per system (e.g., computer system 100 of FIG. 1).

If the selected file (e.g., file 221 of FIG. 2) is larger than the predetermined size threshold, process 1000 proceeds to 1011 of FIG. 10C. If the selected file is smaller than the predetermined size threshold, there are no files on the selected data storage device which are large enough to move. Process 1000 then proceeds to step 1008.

In step 1008 of FIG. 10B, a logic operation is performed to determine whether another data storage device of data storage array 105 should be compacted.

In embodiments of the present invention, parameters can be set to limits the number of data storage devices being compacted. For example, a parameter can be set limiting the compacting process to a specific number of devices such as the first five devices in data storage array 105. In another embodiment, a parameter can be set limiting the compacting process to a specific set of data storage devices in data storage array 105. For example, if data storage array 105 is comprised of 30 data storage devices, the parameter can be set to only compact drives 5–12.

In another embodiment of the present invention, the compacting process is performed upon no more than one half of the total number of data storage devices in data storage array 105. Thus, if data storage array is comprised of 36 data storage devices, the compacting process is performed upon the first 18 data storage devices on drive list 210.

Referring again to step 1008 of FIG. 10B, if there are no more data storage devices in data storage array 105 to be compacted (e.g., no more data storage devices on drive list 210 of FIG. 2), process 1000 ends. If there are other data storage devices remaining on drive list 210, process 1000 continues at step 1018.

In step 1018 of FIG. 10B, the previously selected data storage device is excluded from process 1000. For example, at some point there are no files remaining on device 212 for moving to other data storage devices. Data storage device 212 is then removed from drive list 212 as it will not be included in process 1000.

In step 1020 of FIG. 10B, the free space on the data storage devices remaining on drive list 210 is recalculated. At this point, process 1000 returns to step 1004 of FIG. 10A.

Referring now to step 1011 of FIG. 10C, a receiving data storage device is (e.g., device 215 of FIG. 2) selected. A second data storage device (e.g., device 215 of FIG. 2) is selected from drive list 210 to receive the selected file from data storage device 212.

In step 1012 of FIG. 10C, a logic operation is performed in which the receiving threshold of the selected receiving device is compared with the amount of available free space. In embodiments of the present invention, the amount of free space is compared to the total capacity of the selected data storage device, and if the amount of free space exceeds the receiving threshold, the selected device can receive files from other data storage devices. For example, if the receiving threshold is set at 20%, at least 20% of the total capacity of the selected data storage device should be free space.

If the amount of free space is larger than the receiving threshold, process 1000 continues to step 1013. If the amount of free space on the selected receiving data storage device is less than the receiving threshold, process 1000 continues to step 1016.

In step 1016 of FIG. 10C, the selected receiving device is removed from the list of data storage devices. Because the amount of free space does not exceed the receiving threshold, the selected data storage device is not a candidate for receiving files during process 1000 and is removed from drive list 210. At this point, a new receiving data storage device is selected and process 1000 proceeds from step 1011.

Referring now to step 1013 of FIG. 10C, a logic operation is performed in which the size of the selected file is compared with the available free space on the receiving data storage device. If the selected file is larger than the amount of free space on the selected data storage device, process 1000 continues to step 1017.

In step 1017 of FIG. 10C, a different receiving device is selected from drive list 210. If the selected file is smaller than the amount of available free space on the selected receiving device, process 1000 proceeds to step 1014. In step 1014 of FIG. 10C, the selected file is moved to the selected receiving data storage device. In step 1015 of FIG. 10C, the amount of free space remaining on the receiving device is recalculated. This is to determine whether the data storage device has enough available free space after receiving the file to exceed the receiving threshold and receive additional files.

At this point, process 1000 returns to step 1006 and selects the largest file remaining on file list 220 for moving to another data storage device.

In so doing, a method for compacting data in a data storage array is performed in accordance with one embodiment of the present invention. The present invention consolidates free space in data storage arrays by compacting the data storage array as a whole rather than a collection of separate data storage devices.

The preferred embodiment of the present invention, a method and system for archiving and compacting data in a data storage array, is thus described. While the present invention has been described in particular embodiments, it should be appreciated that the present invention should not be construed as limited by such embodiments, but rather construed according to the following claims.

What is claimed is:

1. A computer system comprising:
   a bus;
   a memory unit coupled with said bus;
   a processor coupled with said bus and for executing a method for transferring data in a data storage array comprising:
   a) archiving a plurality of selected files to remove them from said data storage array;
   b) determining a first configuration of said data storage array calculating a first amount of free space on each of a plurality of data storage devices in said data storage array; and
   c) moving a plurality of files from a first data storage device in said data storage array to a second data storage device in said data storage array to create a second configuration of said data storage array, wherein said first data storage device has a second amount of free space that is greater than said first amount of free space in said first configuration.

2. The computer system of claim 1, wherein said a) of said method comprises:
   a1) recognizing an assigned logical date associated with a file entity of said plurality of selected files defining a beginning of a time period for maintaining said file entity in said centralized data storage array;
   a2) recognizing an assigned category associated with said file entity defining a length of said time period for maintaining said file entity in said centralized data storage array;
   a3) creating a list of candidate file entities and adding said file entity to said list of candidate file entities when said time period for maintaining said file entity in said centralized data storage array has elapsed;
   a4) identifying an archivable file entity from said list of candidate file entities and creating a copy of said archivable file entity; and
   a5) removing said archivable file entity from said data storage array.

3. The computer system of claim 2, wherein said a3) of said method comprises:
   determining a current date;
   determining an archival date wherein said time period for maintaining said file entity in said data storage array is subtracted from said current date;
   comparing said archival date with said logical date and automatically adding said file entity to said list of candidate file entities when said logical date precedes said archival date;
   automatically adding a file entity without said logical date to said list of candidate file entities; and
   automatically adding a file entity without said category to said list of candidate file entities.

4. The computer system of claim 3, wherein one of said candidate file entities is identified as an exception and wherein said method further comprises removing said exception from said list of candidate entities.

5. The computer system of claim 1, where in said c) of said method comprises:
   c1) selecting said first data storage device in said data storage array;
   c2) selecting a first file from said first data storage device; and
   c3) moving said first file from said first data storage device to a second data storage device in said data storage array.

6. The computer system of claim 5, wherein said c1) of said method comprises:
   sorting said plurality of data storage devices in a descending order based upon said first amount of free space on each of said plurality of data storage devices;
   selecting a third data storage device in said data storage array as a support device comprising an amount of free space that is greater than any other of said plurality of data storage devices; and
   selecting a data storage device comprising an amount of free space that is less than said amount of free space on said support device but is greater than an amount of free space on any other of said plurality of data storage devices.

7. The computer system of claim 6, wherein a plurality of files resident upon said support device are exempted from said moving during said process and comprising utilizing said support device when moving a file from said first data storage device to said second data storage device.

8. The computer system of claim 5, wherein said c2) of said method comprises:
   calculating a size of each of said plurality of files stored on said first data storage device;
   sorting said plurality of said files in descending order based upon said size of each of said files; and
   selecting a largest of said plurality of files as said first file and comparing said first file with a predetermined size threshold, wherein said predetermined size threshold defines a minimum size for a file being moved.

9. The computer system of claim 5, wherein said c3) of said method comprises:
   comparing each of said plurality of data storage devices with a predetermined receiving threshold; and
   selecting one of said plurality of data storage devices which exceeds said predetermined receiving threshold and has an amount of free space large enough to accommodate said first file, as said second data storage device;
   moving said first file to said second data storage; and
   recalculating said amount of free space on said second data storage device after said moving of said first file.

10. The computer system of claim 9, wherein said d) of said method comprises:
    repeating said process until there are no files resident on said first storage device larger than said size threshold;
    excluding said first data storage device from subsequent compacting steps;
    repeating said b), wherein an amount of free space on each remaining data storage device in said data storage array is calculated; and
    initiating said process upon a fourth data storage device in said data storage array having an amount of free space that is less than said first data storage device but is greater than an amount of free space on any other of said remaining data storage device in said data storage array.

11. The computer system of claim 1, wherein said method further comprises:
    calculating a total number of said plurality of data storage devices;
    sorting said total number of said plurality of data storage devices in descending order based upon an amount free space on each of said plurality of data storage devices; and
    moving said plurality of files from a first half of said total number of said plurality of data storage devices, wherein said first half of said total number of said plurality of data storage devices comprises a greater amount of said free space than a second half of said total number of said plurality of data storage devices.

12. The computer system of claim 1, wherein said method further comprises designating specific sub-group of said plurality of data storage devices for compacting.

13. The computer system of claim 1, wherein said method further comprises designating a number of repetitions for said performing of said process for moving said plurality of files.

14. A method for transferring data stored on a centralized data storage array comprising:
    recognizing an assigned logical date associated with a file entity defining a beginning of a time period for maintaining said file entity in said centralized data storage array;
    recognizing an assigned category associated with said file entity defining a length of said time period for maintaining said file entity in said centralized data storage array;
    adding said file entity to a list of candidate entities when said time period for maintaining said file entity in said centralized data storage array has elapsed; and
    identifying an archivable file entity from said list of candidate entities and archiving a copy of said archivable file entity.

15. The method as recited in claim 14, wherein said recognizing of said assigned category further comprises recognizing an exception rule which prevents said adding said of file entity to said list of candidate entities.

16. The method as recited in claim 14, wherein adding of said file entity to said list of candidate entities comprises:
    determining a current date;
    determining an archival date wherein said time period for maintaining said file entity in said centralized data storage array is subtracted from said current date; and
    comparing said archival date with said logical date and automatically adding said file entity to said list of candidate entities when said logical date precedes said archival date.

17. The method as recited in claim 14 further comprising:
    adding a file entity without said assigned logical date to said list of candidate file entities; and
    adding a file entity without said assigned category to said list of candidate file entities.

18. The method as recited in claim 17, wherein said length of said time period for maintaining said file entity in said centralized data storage array is extended for a file entity identified as an ad-hoc exception, and further comprising removing said ad-hoc exception from said list of candidate entities.

19. The method as recited in claim 14, wherein a file entity which is not identified as an archivable file entity is removed from said centralized data storage array and comprising removing said archivable file entity from said centralized data storage array after said archiving of said archivable file entity.

20. A method for transferring data stored in a data storage array comprising:
 a) determining a first configuration of said data storage array wherein a first amount of free space on each of a plurality of data storage devices in said data storage array is calculated;
 b) moving a plurality of individual file entities between said plurality of data storage devices wherein said b) comprises:
  b1) selecting a first data storage device in said data storage array;
  b2) selecting a first file entity from said first data storage device; and
  b3) moving said first file entity from said first data storage device to a data storage device of said plurality of other data storage devices in said data storage array to create a second configuration of said data storage array, wherein said first data storage device has a second amount of free space that is greater than said first amount of free space in said first configuration.

21. The method as recited in claim 20, wherein said b1) of said method comprises:
 sorting said plurality of data storage devices in a descending order based upon said first amount of free space on each of said plurality of data storage devices;
 selecting a third data storage device in said data storage array as a support device comprising an amount of free space that is greater than any other of said plurality of data storage devices; and
 selecting a data storage device, comprising an amount of free space that is less than said amount of free space on said support device but is greater than an amount of free space on any other of said plurality of data storage devices, as said first data storage device.

22. The method as recited in claim 21, wherein a plurality of file entities resident upon said support device are exempted from said moving during said process and comprising utilizing said support device when moving a file entity from said first data storage device to said second data storage device.

23. The method as recited in claim 20, wherein said b2) of said method comprises:
 calculating a size of each of a plurality of file entities stored on said first data storage device;
 sorting said plurality of said file entities in descending order based upon said size of each of said file entities; and
 selecting a largest of said plurality of file entities as said first file entity and comparing said first file entity with a predetermined size threshold, wherein said predetermined size threshold defines a minimum size for a file entity being moved.

24. The method as recited in claim 20, wherein said b3) of said method comprises:
 comparing each of said plurality of data storage devices with a predetermined capacity threshold; and
 selecting one of said plurality of data storage devices which exceeds said predetermined capacity threshold and has an amount of free space large enough to accommodate said first file entity, as said second data storage device;
 moving said first file entity to said second data storage device wherein said first file entity is greater than said size threshold; and
 recalculating said amount of free space on said second data storage device after said moving of said first file entity.

25. The method as recited in claim 24, wherein said predetermined capacity threshold is a percentage of said amount of free space in comparison with a total capacity of said data storage device and comprising comparing said first file entity with said percentage.

26. The method as recited in claim 20 wherein said a) of said method comprises:
 calculating a total number of said plurality of data storage devices;
 sorting said total number of said plurality of data storage devices in descending order based upon an amount free space on each of said plurality of data storage devices; and
 moving said plurality of files from a first half of said total number of said plurality of data storage devices, wherein said first half of said total number of said plurality of data storage devices comprises a greater amount of said free space than a second half of said total number of said plurality of data storage devices.

27. The method as recited in claim 20 further comprising identifying a particular group of said plurality of data storage devices for compacting.

28. The method as recited in claim 20 further comprising designating a number of repetitions for said performing of said process.

* * * * *